US007878245B2

(12) United States Patent
Ravi et al.

(10) Patent No.: US 7,878,245 B2
(45) Date of Patent: Feb. 1, 2011

(54) CEMENT COMPOSITIONS COMPRISING A HIGH-DENSITY PARTICULATE ELASTOMER AND ASSOCIATED METHODS

(75) Inventors: Krishna M. Ravi, Kingwood, TX (US); Joseph K. Maxson, Duncan, OK (US); Ashok K. Santra, Duncan, OK (US)

(73) Assignee: Halliburton Energy Services Inc., Duncan, OK (US)

( * ) Notice: Subject to any disclaimer, the term of this patent is extended or adjusted under 35 U.S.C. 154(b) by 0 days.

(21) Appl. No.: 12/206,229

(22) Filed: Sep. 8, 2008

(65) Prior Publication Data

US 2009/0095475 A1   Apr. 16, 2009

Related U.S. Application Data

(60) Provisional application No. 60/978,951, filed on Oct. 10, 2007.

(51) Int. Cl.
*E21B 33/13* (2006.01)

(52) U.S. Cl. .................. 166/292; 166/305.1

(58) Field of Classification Search ............... None
See application file for complete search history.

(56) References Cited

U.S. PATENT DOCUMENTS

| | | | |
|---|---|---|---|
| 5,779,787 A | 7/1998 | Brothers et al. | |
| 6,508,305 B1 | 1/2003 | Brannon et al. | |
| 6,645,288 B1 | 11/2003 | Dargaud et al. | |
| 6,830,105 B2 | 12/2004 | Thesing | |
| 6,832,651 B2 | 12/2004 | Ravi et al. | |
| 6,902,001 B2 | 6/2005 | Dargaud et al. | |
| 6,907,929 B2 | 6/2005 | Leroy-Delage et al. | |
| 6,951,250 B2 | 10/2005 | Reddy et al. | |
| 6,962,201 B2 | 11/2005 | Brothers | |
| 7,007,755 B2 | 3/2006 | Reddy et al. | |
| 7,138,446 B2 | 11/2006 | Reddy et al. | |
| 7,172,022 B2 | 2/2007 | Reddy et al. | |
| 7,264,053 B2 | 9/2007 | Vargo, Jr. et al. | |
| 7,284,611 B2 | 10/2007 | Reddy et al. | |
| 7,328,756 B2 | 2/2008 | Reddy et al. | |
| 7,337,841 B2 | 3/2008 | Ravi | |
| 7,373,981 B2 | 5/2008 | Kulakofsky et al. | |
| 7,494,711 B2 * | 2/2009 | Kaufman et al. ............ | 428/403 |
| 7,717,180 B2 * | 5/2010 | Badalamenti et al. ....... | 166/292 |
| 2004/0144537 A1 | 7/2004 | Reddy et al. | |
| 2004/0180794 A1 | 9/2004 | Reddy et al. | |
| 2004/0194971 A1 * | 10/2004 | Thomson ................... | 166/387 |
| 2004/0244978 A1 * | 12/2004 | Shaarpour ................. | 166/293 |
| 2004/0261990 A1 | 12/2004 | Bosma et al. | |
| 2005/0019209 A1 | 1/2005 | Burger et al. | |
| 2005/0056057 A1 | 3/2005 | Marcolin | |
| 2005/0061206 A1 | 3/2005 | Reddy et al. | |
| 2005/0113262 A1 | 5/2005 | Ravi et al. | |
| 2007/0017676 A1 | 1/2007 | Reddy et al. | |
| 2007/0062691 A1 | 3/2007 | Reddy et al. | |
| 2007/0137528 A1 | 6/2007 | Leroy-Delage et al. | |
| 2007/0151484 A1 | 7/2007 | Reddy et al. | |
| 2007/0151730 A1 | 7/2007 | Reddy et al. | |
| 2007/0204765 A1 | 9/2007 | Le Roy-Delage et al. | |
| 2008/0099203 A1 | 5/2008 | Mueller et al. | |

FOREIGN PATENT DOCUMENTS

| | | |
|---|---|---|
| WO | WO02/059452 A1 | 8/2002 |
| WO | 03008756 | 1/2003 |
| WO | 2004057715 | 7/2004 |
| WO | 2004101951 | 11/2004 |
| WO | 2004101952 | 11/2004 |
| WO | 2006053896 | 5/2006 |
| WO | WO2008/001112 A1 | 1/2008 |

OTHER PUBLICATIONS

"Polytetrafluoroethylene" From Wikipedia, the free encyclopedia, retrieved Jun. 16, 2010 from http://en.wikipedia.org/wiki/Polytetrafluoroethylene.*
International Search Report and Written Opinion for PCT/GB2008/003402, dated Mar. 31, 2009.
DuPont "Tedlar® polyvinyl fluoride film, General Properties", Technical Information, Oct. 1995.
Dyneon™ "Fluorothermoplastics PFA-Flex UHP, PFA-Flex X 8502 UHP, PFA-Flex X 8515 UHP," Technical Information, Aug. 2001.
Dyneon™ "Fluorothermoplastics PFA X 6502 UHP, PFA X 6505 UHP and PFA X 6515 UHP," Product Summary, Aug. 2001.

(Continued)

*Primary Examiner*—Zakiya W Bates
*Assistant Examiner*—Angela M Ditrani
(74) *Attorney, Agent, or Firm*—Craig W. Roddy; Baker Botts.LLP

(57) ABSTRACT

A variety of methods and compositions, including, in one embodiment, a method of treating a subterranean formation comprising introducing a treatment fluid into a well bore, wherein the treatment fluid comprises a particulate elastomer having a specific gravity of at least about 1.6. Another method of treating a subterranean formation comprises introducing a treatment fluid into a well bore, wherein the treatment fluid comprises a particulate elastomer having a specific gravity of at least about 1.05, wherein the particulate elastomer comprises a halogenated thermoplastic.

15 Claims, No Drawings

OTHER PUBLICATIONS

Dyneon™ "Fluorothermoplastics THV 220A," Technical Information, Aug. 2001.

DuPont™ Tefzel® 200, fluoropolymer resin, "Extrusion and Molding Resin," Product Information, Aug. 2002.

Dyneon™ "Fluorothermoplastics ET 6235," Technical Information, Jan. 2003.

Solvay Solexis, "Tecnoflon® FOR 210," Cure incorporated copolymer, Rev. Jan. 2003.

Kalrez® perfluoroelastomer parts for "reliable, long-term sealing" in extreme chemical and thermal environments, Mar. 2003.

Onan, D.D., "Elastomeric Composites for Use in Well Cementing Operations," Society of Petroleum Engineers, SPE 26572, pp. 593-608, Oct. 3-6, 1993.

Dyneon™ "Fluorothermoplastics" PFA 6502N, PFA 6505N, PFA 6515N and PFA 6525N, Product Summary, Mar. 2004.

Dyneon™ "Fluoroplastic PVDF 1008/0001," Technical Information, Aug. 2004.

Halliburton, "CFR-3™ Cement Friction Reducer, Dispersant," Cementing, Oct. 2005.

Viton® "Specify Viton® fluoroelastomers for superior sealing performance in a wide variety of aggressive applications," (Oct. 2005).

Dyneon™ "Fluorothermoplastics ET 6210A," Technical Information, Dec. 2005.

Dyneon™ "Fluorothermoplastics FEP 6301, FEP 6303 and FEP 6307," Technical Information, Dec. 2005.

Halliburton, "Micro Matrix® Cement," Cementing, Nov. 2006.

Arkema, "Kynar® & Kynar Flex® PVDF," Performance Characteristics & Data, 2007.

Cavanagh, P., et al., "Self-Healing Cement—Novel Technology To Achieve Leak-Free Wells," Society of Petroleum Engineers, SPE/IADC 105781, pp. 1-13, Feb. 20-22, 2007.

Halliburton, "Halad®-344, Fluid Loss Additive," Cementing, Aug. 2007.

Halliburton, "Halad®-413, Fluid-Loss Additive," Cementing, Aug. 2007.

Halliburton, "SCR-100™ Cement Retarder," Cementing, Aug. 2007.

Halliburton, "SSA-2™ Coarse Silica Flour," Cementing, Aug. 2007.

Halliburton, "SSA-1™ Strength-Stabilizing Agent," Cementing Aug. 2007.

Halliburton, "MICROMAX™ Weight Additive," Cementing Aug. 2007.

Solvay Solexis, "Halar 1400LC ECTFE Very Low Viscosity—Melt Blown Fiber Extrusion," Nov. 2007.

N. Moroni, et al., "Overcoming the Weak Link in Cemented Hydraulic Isolation," Society of Petroleum Engineers, SPE 110523, pp. 1-13, Nov. 11-14, 2007.

Halliburton, "WellLife® III Cementing Service," Apr. 2008.

Daikin Industries, Website page www.daikin.com/chm/pro/fluoro/newpri.html, Aug. 11, 2008.

* cited by examiner

CEMENT COMPOSITIONS COMPRISING A HIGH-DENSITY PARTICULATE ELASTOMER AND ASSOCIATED METHODS

CROSS-REFERENCE TO RELATED APPLICATIONS

This application claims the benefit of U.S. Provisional Application No. 60/978,951, entitled "Cement Compositions Comprising a High-Density Particulate Elastomer and Associated Methods," filed on Oct. 10, 2007, the entire disclosure of which is incorporated herein by reference.

BACKGROUND

The present invention relates to subterranean treatment fluids and associated methods. More specifically, in certain embodiments, the present invention relates to cement compositions that comprise a particulate elastomer having a specific gravity of at least about 1.05 and associated methods.

Cement compositions are one type of subterranean treatment fluid that may be used in a variety of subterranean applications. For example, in subterranean well construction, a pipe string (e.g., casing, liners, expandable tubulars, etc.) may be run into a well bore and cemented in place. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement (i.e., a cement sheath) that may support and position the pipe string in the well bore and may bond the exterior surface of the pipe string to the subterranean formation. Among other things, the cement sheath surrounding the pipe string functions to prevent the migration of fluids in the annulus, as well as protecting the pipe string from corrosion. Cement compositions also may be used in remedial cementing methods, for example, to seal cracks or holes in pipe strings or cement sheaths, to seal highly permeable formation zones or fractures, to place a cement plug, and the like. Cement compositions also may be used in surface applications, for example, construction cementing.

Once set, the cement sheath may be subjected to a variety of cyclic, shear, tensile, impact, flexural, and/or compressive stresses that may lead to failure of the cement sheath, resulting, for example, in fractures, cracks, and/or debonding of the cement sheath from the pipe string and/or the formation. This may lead to undesirable consequences such as lost production, environmental pollution, hazardous rig operations resulting from unexpected fluid flow from the formation caused by the loss of zonal isolation, and/or hazardous production operations. Furthermore, failure of the cement sheath also may be caused by forces exerted by shifts in subterranean formations surrounding the well bore, cement erosion, and repeated impacts from the drill bit and the drill pipe.

To counteract these problems, various additives may be included in the cement composition to enable the cement composition to withstand cyclic changes in imposed stresses. For example, hydrocarbon-based elastomers (e.g., styrene-butadiene random and block copolymers, acrylonitrile-butadiene, and acrylonitrile-styrene-butadiene elastomers) have been included in cement compositions to modify the mechanical and expansion properties of the cement composition. Generally, such materials are used in the particulate form. As used herein, the term "particulate" refers to materials in solid state having a well-defined physical shape as well as those with irregular geometries, including any particulates elastomers having the physical shape of platelets, shavings, fibers, flakes, ribbons, rods, strips, spheroids, hollow beads, toroids, pellets, tablets, or any other physical shape. Among other things, the particulate elastomers may function to control shrinkage cracking in the early stages of the cement setting process, and also may provide resiliency, ductility, expansion, and toughness to the set cement composition (e.g., the cement sheath) so that it resists and seals cracking or fracturing.

The use of particulate elastomers in cement compositions, however, may be problematic. For example, particulate elastomers used heretofore generally have a density equal to or less than water. Accordingly, these particulate elastomers may be particularly suited for use in lower-density cement compositions. These low-density particulate elastomers have also been used in higher-density cement compositions (e.g., greater than about 15 pounds per gallon), as no suitable higher-density particulate elastomers have been available. However, when used in the higher-density cement compositions, heavyweight additives may need to be used to compensate for the low-density particulate elastomers. The concentration of the heavyweight additives that may be needed to compensate for the low-density particulate elastomers, however, may undesirably affect certain properties of the cement compositions, such as its mixability and rheology.

SUMMARY

The present invention relates to subterranean treatment fluids and associated methods. More specifically, in certain embodiments, the present invention relates to cement compositions that comprise a particulate elastomer having a specific gravity of at least about 1.05 and associated methods.

In one embodiment, the present invention provides a method of treating a subterranean formation comprising: introducing a treatment fluid into a well bore, wherein the treatment fluid comprises a particulate elastomer having a specific gravity of at least about 1.6.

In one embodiment, the present invention provides a method of treating a subterranean formation comprising: introducing a treatment fluid into a well bore, wherein the treatment fluid comprises a particulate elastomer having a specific gravity of at least about 1.05, wherein the particulate elastomer comprise a halogenated thermoplastic.

In one embodiment, the present invention provides a treatment fluid comprising a particulate elastomer having a specific gravity of at least about 1.6.

In one embodiment, the present invention provides a treatment fluid comprising a particulate elastomer having a specific gravity of at least about 1.05, wherein the particulate elastomer comprises a halogenated thermoplastic.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean treatment fluids and associated methods. More specifically, in certain embodiments, the present invention relates to cement compositions that comprise a particulate elastomer having a specific gravity of at least about 1.05 and associated methods. As used herein, a particulate elastomer having a specific gravity of at least about 1.05 will be referred to as a "high-density particulate elastomer."

In some embodiments, the cement compositions of the present invention generally comprise cement, water, and a high-density particulate elastomer. Those of ordinary skill in the art will appreciate that the cement compositions of the present invention generally should have a density suitable for a particular application. By way of example, the cement compositions of the present invention may have a density in the range of about 4 pounds per gallon ("lb/gal") to about 24 lb/gal. In certain embodiments, the cement compositions of the present invention have a density in the range of about 8 lb/gal to about 19 lb/gal. Embodiments of the cement compositions may be foamed or unfoamed or may comprise other means to reduce their densities, such as hollow microspheres, low-density elastic beads, or other density-reducing additives known in the art. In addition, embodiments of the cement composition may comprise heavyweight additives (e.g., hematite, magnesium oxide, etc.). However, as discussed in more detail below, the need for the heavyweight additives to achieve a particular density may be reduced, or potentially eliminated, when using the high-density particulate elastomer as compared to a low-density particulate elastomer. One of ordinary skill in the art with the benefit of this disclosure will recognize the appropriate density of the cement composition for a chosen application.

Any cement suitable for use in subterranean applications may be suitable for use in the present invention. In certain embodiments, the cement compositions of the present invention comprise a hydraulic cement. Suitable examples of hydraulic cements that may be used include, but are not limited to, those that comprise calcium, aluminum, silicon, oxygen, and/or sulfur, which set and harden by reaction with water. Examples include, but are not limited to, Portland cements, pozzolanic cements, gypsum cements, calcium-phosphate cements, high-alumina-content cements, silica cements, high-alkalinity cements, and mixtures thereof.

The water utilized in the cement compositions of the present invention may be fresh water, salt water (e.g., water containing one or more salts dissolved therein), brine (e.g., saturated salt water), or seawater. Generally, the water may be from any source, provided that it should not contain an excess of compounds that may adversely affect other components in the cement composition. Further, the water may be present in an amount sufficient to form a pumpable slurry. In certain embodiments, the water is present in the cement composition in an amount in the range of about 30% to about 180% by weight of the cement ("bwoc") therein. In certain embodiments, the water is present in the cement composition in the range of about 40% to about 90% bwoc. In certain embodiments, the water is present in the cement composition in the range of about 40% to about 60% bwoc. One of ordinary skill in the art with the benefit of this disclosure will recognize the appropriate amount of water for a chosen application.

The cement compositions of the present invention further comprise a high-density particulate elastomer. Among other things, it is believed that the high-density particulate elastomer should generally provide the set cement composition a lower Young's modulus, higher recoverable elongation, greater resilience/toughness without unduly compromising its compressive strength. Accordingly, the set cement composition, at least in some instances, should be more able to withstand the stresses encountered in a downhole environment that may, for example, lead to failure of a cement sheath. Moreover, the high-density particulate elastomer included in the cement compositions of the present invention is generally heavier than the particulate elastomers used heretofore, in that the particulate elastomers used heretofore generally have a density equal to or less than water, i.e., a specific gravity of about 1.0. Of their many potential advantages, one such advantage of using the high-density particulate elastomer is that the need for heavyweight additives may be reduced or even eliminated. As such, the mixability and rheology issues associated with heavyweight additives may be reduced or even eliminated.

As previously mentioned, the high-density particulate elastomer included in the cement compositions of the present invention has a specific gravity of at least about 1.05. In certain embodiments, the high-density particulate elastomer may have a specific gravity of at least about 1.1 (e.g., about 1.2, about 1.3, about 1.4, about 1.5, about 1.6, about 1.7, about 1.8, about 1.9, about 2.0, about 2.1, about 2.2, etc.). In certain embodiments, the high-density particulate elastomer may have a specific gravity of at least about 1.6. In certain embodiments, the high-density particulate elastomer may have a specific gravity of at least about 2.0. In one particular embodiment, the high-density particulate elastomer may have a specific gravity of about 2.15. As will be appreciated, as the specific gravity of the particulate elastomer used increases, the amount of the heavyweight additive that may be needed to prepare a cement composition of a particular density decreases.

Any of a variety of high-density particulate elastomers having a specific gravity of at least about 1.05 may be included in the cement compositions of the present invention. Examples of suitable high-density particulate elastomers include, but are not limited to, particulate elastomers that comprise a thermoplastic. Examples of suitable thermoplastics include, but are not limited to, halogenated thermoplastics, such as fluoroplastics. Thermoplastics that do not comprise fluorine atoms may also be suitable for use, in certain embodiments. In general, fluoroplastics may be characterized by their high chemical resistance, for example, it is believed that the fluoroplastics do not degrade in a carbon dioxide environment. As such, the fluoroplastics generally should undergo negligible, if any, swelling when exposed to fluids (e.g., brines, hydrocarbons, etc.) downhole. Furthermore, fluoroplastics may be suitable for use in carbon sequestration applications. In addition, fluoroplastics generally may be characterized by their temperature stability. For example, fluoroplastics generally may retain their structural integrity at temperatures in excess of 600° F. Accordingly, while the fluoroplastics are suitable for use in applications having a wide variety of temperatures, they may be particularly suitable for use in high-temperature applications, such as those having a bottom hole circulating temperature ("BHCT") greater than about 600° F.

Fluoroplastics that are suitable for use in embodiments of the cement compositions of the present invention generally include thermoplastic polymers that comprise fluorine atoms. Examples of suitable fluoroplastics include, but are not limited to: fluorinated polymers of ethylene and propylene; polymers of tetrafluoroethylene and perfluorovinylether; polymers of tetrafluoroethylene and ethylene; polymers of tetrafluoroethylene and hexafluoropropylene; polymers of vinylidene fluoride; polymers of tetrafluoroethylene, hexafluoropropylene, and vinylidene fluoride; polytetrafluoroethylene (PTFE); perfluoroalkoxy polymer resin (PFA); chlorotrifluoroethylene (CTFE); fluorinated ethylene-propylene (FEP); polyethylenetetrafluoroethylene (ETFE); polyvinylfluoride (PVF); polyethylenechlorotrifluoroethylene (ECTFE); polyvinylidene fluoride (PVF); polychlorotrifluoroethylene (CTFE); perfluoroelastomers (FFKM); fluorocarbon elastomers (FPM/FKM). Combinations of suitable fluoroplastics may also be used. Examples of suitable fluoroplastics are available from: Dyneon, a 3M company, under the brandname DYNEON™ fluoropolymers; from Dupont, under the brandnames VITON® fluoropolymers, TEFZEL® fluoropolymer resin, KALREZ® FFKM, and TEDLAR® polyvinyl fluoride; Solvay Solexis, under the brandnames TECNOFLON® fluoropolymers and HALAR® ECTFE; Arkema Inc., under the brandname KYNAR® PVDF; Daikin America, Inc. under the brandname NEOFLON® fluoropolymers.

As set forth above, thermoplastics that do not comprise fluorine atoms may be also be suitable for use in certain embodiments. Examples of suitable thermoplastics that do not comprise fluorine atoms, include, but are not limited to, polyamide imide (PAI), polyetherether ketone (PEEK), polyphenylene sulfide (PPS), polyetherketone (PEK), and combinations thereof.

The high-density particulate elastomer generally should be present in the cement compositions of the present invention in an amount sufficient to provide the desired mechanical properties, such as, for example, resiliency, compressive strength, and tensile strength. In some embodiments, the high-density particulate elastomer may be present in the cement compositions of the present invention in an amount from about 0.5% to about 50% bwoc, alternatively from about 1% to about 20% bwoc, and alternatively from about 4% to about 15% bwoc.

In addition, the high-density particulate elastomer present in the cement compositions of the present invention may have a wide variety of shapes and sizes of individual particles suitable for use in the cement compositions of the present invention. By way of example, the high-density particulate elastomers may have well-defined physical shapes as well as irregular geometries, including the physical shape of platelets, shavings, fibers, flakes, ribbons, rods, strips, spheroids, hollow beads, toroids, pellets, tablets, or any other physical shape. In some embodiments, the high-density particulate elastomer may have a particle size in the range of about 5 microns to about 1,500 microns. In some embodiments, the high-density particulate elastomer may have a particle size in the range of about 20 microns to about 500 microns. However, particle sizes outside these defined ranges also may be suitable for particular applications.

The cement compositions of the present invention further may comprise a swellable elastomer. As used herein, an elastomer is characterized as swellable when it swells upon contact with an oleaginous and/or an aqueous fluid, such as water. Among other things, the inclusion of a swellable elastomer may help to provide zonal isolation, for example, by swelling to seal the annulus if any oleaginous or aqueous fluids flow through any cracks and/or micro-annulus that may be created in the cement sheath during well operations.

Swellable elastomers suitable for use in the cement compositions of the present invention may generally swell by up to about 500% of their original size at the surface. Under downhole conditions, this swelling may be more or less depending on the conditions presented. For example, the swelling may be at least 10% at downhole conditions. In some embodiments, the swelling may be up to about 200% under downhole conditions. However, as those of ordinary skill in the art, with the benefit of this disclosure, will appreciate, the actual swelling when the swellable elastomer is included in a cement composition may depend on, for example, the concentration of the swellable elastomer included in the cement composition. In general, the swellable elastomers included in the cement compositions of the present invention have a specific gravity of about 1.0. Some specific examples of suitable elastomers that swell upon contact with an oleaginous fluid and/or an aqueous fluid include, but are not limited to, natural rubber, acrylate butadiene rubber, polyacrylate rubber, isoprene rubber, chloroprene rubber, butyl rubber (IIR), brominated butyl rubber (BIIR), chlorinated butyl rubber (CIIR), chlorinated polyethylene (CM/CPE), neoprene rubber (CR), styrene butadiene copolymer rubber (SBR), sulphonated polyethylene (CSM), ethylene acrylate rubber (EAM/AEM), epichlorohydrin ethylene oxide copolymer (CO, ECO), ethylene-propylene rubber (EPM and EDPM), ethylene-propylene-diene terpolymer rubber (EPT), ethylene vinyl acetate copolymer, fluorosilicone rubbers (FVMQ), silicone rubbers (VMQ), poly 2,2,1-bicyclo heptene (polynorborneane), alkylstyrene, crosslinked substituted vinyl acrylate copolymers and diatomaceous earth. Examples of suitable elastomers that swell when in contact with aqueous fluid include, but are not limited to, nitrile rubber (NBR), hydrogenated nitrile rubber (HNBR, HNS), fluoro rubbers (FKM), perfluoro rubbers (FFKM), tetrafluoroethylene/propylene (TFE/P), starch-polyacrylate acid graft copolymer, polyvinyl alcoholcyclic acid anhydride graft copolymer, isobutylene maleic anhydride, acrylic acid type polymers, vinylacetate-acrylate copolymer, polyethylene oxide polymers, carboxymethyl cellulose type polymers, starch-polyacrylonitrile graft copolymers and the like, polymethacrylate, polyacrylamide, and non-soluble acrylic polymers. Combinations of suitable swellable elastomer may also be used. One example of a suitable swellable elastomer includes WELL LIFE™ 665 additive, available from Halliburton Energy Services, Inc., Duncan, Okla. Other swellable materials that behave in a similar fashion with respect to oleaginous fluids or aqueous fluids also may be suitable. Those of ordinary skill in the art, with the benefit of this disclosure, will be able to select an appropriate swellable elastomer for use in the compositions of the present invention based on a variety of factors, including the application in which the composition will be used and the desired swelling characteristics.

Where used, the swellable elastomer generally may be present in the cement compositions of the present invention in an amount sufficient to provide the desired mechanical properties. In some embodiments, the swellable elastomer may be present in the cement compositions of the present invention in an amount from about 0.5% to about 50% bwoc, alternatively from about 1% to about 20% bwoc, and alternatively from about 4% to about 15% bwoc.

Those of ordinary skill in the art, with the benefit of this disclosure, will appreciate that the ratio of the swellable elastomer to the high-density particulate elastomer may be optimized to the various properties of each elastomer, such as high-chemical resistance (e.g., the fluoroplastics) and swelling characteristics (e.g., the swellable elastomers). For example, a cement composition may be designed to include a particular concentration of elastomeric materials. In certain embodiments, it may be desired for the elastomeric materials to include a high-density particulate elastomer and a swellable elastomer. For example, optimal swelling characteristics of the elastomeric materials may be achieved with only a portion of the elastomeric material comprising the swellable elastomer. Likewise, optimal chemical resistance of the elastomeric materials may be achieved with only a portion of the elastomeric material comprising the high-density particulate elastomer, for example. Accordingly, a method of the present invention may include determining a concentration of the particulate elastomer and the swellable elastomer to include based, for example, on the desired mechanical properties of the cement composition, desired swelling of elastomeric materials in the cement composition, desired chemical resistance of elastomeric materials in the cement composition.

In addition, the swellable elastomer that may be present in the cement compositions of the present invention may have a wide variety of shapes and sizes of individual particles suitable for use in the cement compositions of the present invention. By way of example, the swellable elastomer may have a well-defined physical shape as well as an irregular geometry, including the physical shape of platelets, shavings, fibers, flakes, ribbons, rods, strips, spheroids, hollow beads, toroids, pellets, tablets, or any other physical shape. In some embodiments, the swellable elastomer may have a particle size in the range of about 5 microns to about 1,500 microns. In some embodiments, the swellable elastomer may have a particle size in the range of about 20 microns to about 500 microns. However, particle sizes outside these defined ranges also may be suitable for particular applications.

Optionally, other additives suitable for use in subterranean cementing operations also may be added to the cement compositions of the present invention. Examples of such additives include, but are not limited to, strength-retrogression additives, set accelerators, weighting agents, weight-reducing additives, heavyweight additives, lost-circulation materials, filtration-control additives, dispersants, defoaming agents, foaming agents, and combinations thereof. Specific examples of these, and other, additives include, but are not limited to, crystalline silica, amorphous silica, salts, fibers, hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, with the benefit of this disclosure, the cement compositions of the present invention may be used in a variety of subterranean applications, including, but not limited to, primary cementing and remedial cementing. For example, in primary cementing applications, the cement compositions may be introduced into an annulus between a pipe string located in a subterranean formation and the subterranean formation and allowed to set therein. It is to be understood that "subterranean formation" encompasses both areas below exposed earth and areas below earth covered by water, such as ocean or fresh water. In addition, in remedial cementing applications, the cement compositions may used, for example, in squeeze cementing operations or in the placement of cement plugs. Moreover, the cement compositions of the present invention also may be used in surface applications, such as construction cementing.

In accordance with embodiments of the present invention, a cement composition may be introduced into a selected location and allowed to set therein. As will be appreciated, the selected location may any suitable location above ground or in a well bore where it is desired for the cement composition to set into a hardened mass. For example, the selected location may in a well bore penetrating a subterranean formation, such as an annulus between a pipe string located in the subterranean formation and the subterranean formation.

While the preceding discussion is directed to the use of a high-density particulate elastomer in well cementing methods, those of ordinary skill in the art will appreciate that the present technique also encompasses the use of high-density particulate elastomers in a variety of different subterranean treatments, including drilling fluids, completing fluids, stimulation fluids, spacer fluids, and well clean-up fluids. In accordance with one embodiment, a high-density particular elastomer may be included in a spacer fluid. For example, a spacer fluid may be placed between two fluids contained in or to be pumped within a well bore. Examples of fluids between which spacer fluids are utilized include between cement compositions, and drilling fluids, between different drilling fluids during drilling fluid changeouts and between drilling fluids and completion brines. Among other things, spacer fluids may be used to enhance drilling fluid and filter cake removal from the walls of well bores, to enhance displacement efficiency and to physically separate chemically incompatible fluids. For example, a hydraulic cement composition and a drilling fluid may be separated by a spacer fluid when the cement composition is placed in the well bore. In accordance with embodiments of the present invention, the spacer fluid may prevent, or at least partially reduce, intermixing of the cement composition and the drilling fluid and may facilitate the removal of filter cake and gelled drilling fluid from the walls of the well bore during displacement of the drilling fluid by the cement composition.

To facilitate a better understanding of the present invention, the following examples of certain aspects of some embodiments are given. In no way should the following examples be read to limit, or define, the entire scope of the invention.

Example 1

To compare the use of high- and low-density particulate elastomers, cement compositions were designed having a density of 17 lb/gal. As illustrated by Tables 1 and 2 below, the cement composition with the high-density particulate elastomer maintained a density of 17 lb/gal without the addition of a heavyweight additive, improving mixability of the cement composition. However, to maintain the density of 17 lb/gal, the cement composition with the low-density particulate elastomer needed 40% bwoc of a heavyweight additive.

Sample Cement Composition No. 1 included the low-density particulate elastomer. As illustrated by Table 1 below, Sample Cement Composition No. 1 was designed to include water in an amount of 53.44% bwoc, Portland Class H cement, the low-density particulate elastomer (WELLIFE™ 665 additive) in an amount of 12% bwoc, a heavyweight additive (MICROMAX™ cement additive from Halliburton Energy Services, Inc.) in an amount of 40% bwoc, a set retarder (SCR-100™ cement additive from Halliburton Energy Services, Inc.) in an amount of 0.5% bwoc, a fluid-loss-control additive (HALAD-413™ fluid-loss additive from Halliburton Energy Services, Inc.) in an amount of 0.6% bwoc, a cement dispersant (CFR-3™ cement dispersant from Halliburton Energy Services, Inc.) in an amount of 0.2% bwoc, silica flour (SSA-1™ cement additive from Halliburton Energy Services, Inc.) in an amount of 20% bwoc, and course silica flour (SSA-2™ cement additive from Halliburton Energy Services, Inc.) in an amount of 20% bwoc. As noted above, Sample Cement Composition No. 1 needed 40% bwoc of the heavyweight additive to provide a density of 17 lb/gal.

TABLE 1

| Additive | % BWOC | Grams | Specific Gravity |
|---|---|---|---|
| Water | 53.44 | 267.2 | 0.998 |
| Portland Class H Cement | 100 | 500 | 3.18 |
| Low-Density | 12 | 60 | 0.99 |

TABLE 1-continued

| Additive | % BWOC | Grams | Specific Gravity |
|---|---|---|---|
| Particulate Elastomer Heavyweight Additive | 40 | 200 | 4.9 |
| Set Retarder | 0.5 | 2.5 | 1.42 |
| Fluid-Loss-Control Additive | 0.6 | 3 | 1.428 |
| Dispersant | 0.2 | 1 | 1.28 |
| Silica Flour | 20 | 100 | 2.63 |
| Course Silica Flour | 20 | 100 | 2.63 |

Sample Composition No. 2 included the high-density particulate elastomer. As illustrated by Table 2, Sample Composition No. 2 was designed to include water in an amount of 49.2% bwoc, Portland Class H cement, a high-density particulate elastomer (DYNEON™ PFA) in an amount of 8% bwoc, a set retarder (SCR-100™ cement additive) in an amount of 0.5% bwoc, a fluid-loss-control additive (HALAD-413™ fluid-loss additive) in an amount of 0.6% bwoc, a cement dispersant (CFR-3™ cement dispersant) in an amount of 0.2% bwoc, silica flour (SSA-1™ cement additive) in an amount of 20% bwoc, and course silica flour (SSA-2™ cement additive) in an amount of 20% bwoc. As noted above, Sample Cement Composition No. 2 did not need any of the heavyweight additive to provide a density of 17 lb/gal because the high-density particulate elastomer was used rather than the low-density particulate elastomer.

TABLE 2

| Additive | % BWOC | Grams | Specific Gravity |
|---|---|---|---|
| Water | 49.2 | 295.2 | 0.998 |
| Portland Class H Cement | 100 | 600 | 3.18 |
| High-Density Particulate Elastomer | 8 | 48 | 2.15 |
| Set Retarder | 0.5 | 3 | 1.42 |
| Fluid-Loss-Control Additive | 0.6 | 3.6 | 1.428 |
| Dispersant | 0.2 | 1.2 | 1.28 |
| Silica Flour | 20 | 120 | 2.63 |
| Course Silica Flour | 20 | 120 | 2.63 |

Example 2

The following tests were performed to evaluate the mechanical properties of a set cement composition that included a high-density particulate elastomer. First, a cement composition was prepared having a density of 14.7 lb/gal and containing water in an amount of 67% bwoc, Portland Class H cement, fly ash in an amount of 27% bwoc, a high-density particulate elastomer (DYNEON™ PFA) in an amount of 20% bwoc, a fluid-loss-control additive (HALAD-344™ EXP fluid-loss additive from Halliburton Energy Services, Inc.) in an amount of 0.6% bwoc, and a cement dispersant (CFR-3™ cement dispersant) in an amount of 0.1 gallons per 94 pound sack of the cement. This sample cement composition was then tested to determine the compressive strength, Young's modulus, and Poisson's ratio. The compressive-strength tests were performed in accordance with API Specification 10. The Young's modulus and Poisson's ratio were statically determined by means of compression testing using a load frame. The Young's modulus (or modulus of elasticity) for each sample was obtained by taking a ratio of a simple tension stress applied to each sample to a resulting strain parallel to the tension in that sample. The Poisson's ratio for each sample was determined by calculating a ratio of transverse strain to a corresponding axial strain resulting from uniformly distributed axial stress below a proportional limit of each sample. The values determined for two series of tests for this sample cement composition are set forth below in Table 3.

TABLE 3

| Test | Confining Pressure (psi) | Compressive Strength (psi) | Young's Modulus | Poisson's Ratio |
|---|---|---|---|---|
| No. 1 | 0 | 947 | 3.93E+05 | 0.173 |
| No. 2 | 0 | 946 | 3.89E+05 | 0.163 |

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of treating a subterranean formation comprising:
    introducing a cement composition into a well bore, wherein the cement composition comprises cement, water, and a particulate elastomer having a specific gravity of at least about 1.6, wherein the particulate elastomer comprises at least one thermoplastic selected from the group consisting of: a fluorinated polymer of ethylene and propylene; a polymer of tetrafluorethylene and perfluorovinylether; a polymer of tetrafluoroethylene and ethylene; a polymer of tetrafluoroethylene and hexafluoropropylene; a polymer of vinylidene fluoride; a polymer of tetrafluoroethylene, hexafluoropropylene, and vinylidene fluoride; perfluoroalkoxy polymer resin; chlorotrifluoroethylene; fluorinated ethylene-propylene; polyethylenetetrafluoroethylene; polyvinylfluoride; polyethylenechlorotrifluoroethylene; polyvinylidene fluoride; polychlorotrifluoroethylene; a perfluoroelastomer; a fluoro-carbon elastomer; polyamide imide, polyetherether ketone, polyphenylene sulfide, polyetherketone; and a combination thereof;
    and allowing the cement composition to set in the well bore.

2. The method of claim 1 wherein the treatment fluid is introduced into the well bore to separate a drilling fluid from another fluid.

3. The method of claim 1 wherein the cement comprises a hydraulic cement.

4. The method of claim 1 wherein the particulate elastomer has a specific gravity of at least about 2.0.

5. The method of claim 1 wherein the particulate elastomer is present in the cement composition in an amount of about 0.5% to about 50% by weight of the cement therein.

6. The method of claim 1 wherein the particulate elastomer has a particle size of about 5 microns to about 1,500 microns.

7. The method of claim 1 wherein the cement composition further comprises a swellable elastomer.

8. The method of claim 7 comprising determining a concentration of the particulate elastomer and a concentration of the swellable elastomer for inclusion in the cement composition based on at least one property selected from the group consisting of: a mechanical property of the cement composition, a swelling property of the swellable elastomer, and a chemical resistance property of the particulate elastomer and the swellable elastomer.

9. The method of claim 1 wherein the cement composition is foamed.

10. A method of treating a subterranean formation comprising:
   introducing a cement composition into a well bore, wherein the cement composition comprises cement, water, and a particulate elastomer having a specific gravity of at least about 1.05, wherein the particulate elastomer comprises a halogenated thermoplastic selected from the group consisting of: a fluorinated polymer of ethylene and propylene; a polymer of tetrafluoroethylene and perfluorovinylether; a polymer of tetrafluoroethylene and ethylene; a polymer of tetrafluoroethylene and hexafluoropropylene; a polymer of vinylidene fluoride; a polymer of tetrafluoroethylene, hexafluoropropylene, and vinylidene fluoride; perfluoroalkoxy polymer resin, chlorotrifluoroethylene; fluorinated ethylene-propylene; polyethylenetetrafluoroethylene; polyvinylfluoride; polyethylenechlorotrifluoroethylene; polyvinylidene fluoride; polychlorotrifluoroethylene; a perfluoroelastomer; a fluoro-carbon elastomer; and a combination thereof;
   and allowing the cement composition to set in the well bore.

11. The method of claim 10 wherein the treatment fluid is introduced into the well bore to separate a drilling fluid from another fluid.

12. The method of claim 10 wherein the particulate elastomer has a specific gravity of at least about 2.0.

13. The method of claim 10 wherein the particulate elastomer has a particle size of about 5 microns to about 1,500 microns.

14. The method of claim 10 wherein the cement composition further comprises a swellable elastomer.

15. The method of claim 14 comprising determining a concentration of the particulate elastomer and a concentration of the swellable elastomer for inclusion in the cement composition based on at least one property selected from the group consisting of: a mechanical property of the cement composition, a swelling property of the swellable elastomer, and a chemical resistance property of the particulate elastomer and the swellable elastomer.

* * * * *